United States Patent [19]

Hall

[11] Patent Number: 5,291,783
[45] Date of Patent: Mar. 8, 1994

[54] TUBE FOR USE IN A FIXED ANGLE CENTRIFUGE ROTOR

[75] Inventor: Richard A. Hall, Kennett Square, Pa.

[73] Assignee: E. I. Du Pont de Nemours and Company, Wilmington, Del.

[21] Appl. No.: 995,512

[22] Filed: Dec. 21, 1992

[51] Int. Cl.$^5$ .............................................. G01F 19/00
[52] U.S. Cl. ........................................ 73/426; 494/10
[58] Field of Search .................... 73/426, 427; 494/10, 494/16, 20

[56] References Cited

U.S. PATENT DOCUMENTS

| | | | |
|---|---|---|---|
| 1,775,109 | 9/1930 | Picker | 494/10 |
| 2,198,256 | 4/1940 | Levy | 494/10 |

OTHER PUBLICATIONS

An Introduction to Centrifugation, T. C. Ford and J. M. Graham, Bio Scientific Publishers, pp. 18 and 166 (no date).
Nalgene Labware 1991, Centrifuge Ware/41 (no date).
Beckman Rotors and Tubes for Preparative Ultracentrifuges, An Operator's Manual, Mar. 1984 LR-IM-12, pp. 4-10.
E. I. Du Pont de Nemours and Company Technical Bulletin Catalogue No. 03069 and 03431 Sorvall® 250-ml Dry-Spin ™ Centrifuge Bottle (no date).

*Primary Examiner*—Thomas B. Will
*Assistant Examiner*—W. Morris Worth

[57] ABSTRACT

A tube for use in a fixed angle centrifuge rotor having a rotor cavity inclined at a predetermined angle $\Theta$ with respect to the axis of rotation is characterized by one or more marking(s) thereon that indicates the level to which the tube may be filled with liquid without risk of spillage due to meniscus re-orientation. The markings may be graduated in terms of angles at which the rotor cavity may be inclined or in terms of the identity of each rotor into which the tube may be inserted.

4 Claims, 1 Drawing Sheet

TUBE FOR USE IN A FIXED ANGLE CENTRIFUGE ROTOR

BACKGROUND OF THE INVENTION

1. Field of the Invention

The present invention relates to a tube for use in a fixed angle centrifuge rotor.

2. Description of the Prior Art

Tubes, whether capped or uncapped, are used to carry sample liquid in centrifugation protocols. Such tubes may have indicated thereon a rated nominal capacity that defines the full volume of the liquid contained within the tube. In addition, the tube may have graduations permanently formed thereon denoting the volume within the tube when the tube is filled to various heights. Such graduated centrifuge tubes are available from a variety of vendors, with the round or conical tubes as shown at page 41 of the Nalgene TM Labware Manual (1991) being representative.

When a tube is used in a fixed angle rotor, i.e., a rotor in which the axis of each rotor cavity is inclined at a predetermined angle $\Theta$ with respect to the axis of rotation, care must be taken to avoid filling the tube to a level that could, due to meniscus reorientation, cause spillage (in an uncapped tube) or cause challenge to the tube seal (in a capped tube, if challenge is a concern).

FIG. 1 permits a full understanding of the problem of meniscus reorientation encountered when a tube as shown is first inserted into a rotor and when the tube is thereafter spun. In FIG. 1 the rotor R is assumed to have a plurality of cavities C each of which is oriented at a predetermined rotor angle $\Theta$, shown as forty-five degrees (45°) with respect to the axis of rotation CL. When the axis A of the tube T is oriented vertically the tube T is filled with a volume of liquid reaching the level $P_f$. When the tube T is first inserted into the rotor the liquid level re-orients to the static position indicated by the character $P_s$. As the rotor R is spun centrifugal force causes the liquid to reorient to the dynamic level $P_d$. Note that in a rotor having a forty-five degree angle and a tube sized and configured as shown in FIG. 1, the volume of liquid that would prevent spillage or seal contact in the static case (the static level $P_s$) is equal to the liquid volume that would prevent spillage or seal challenge while spinning (the dynamic level $P_d$). If the rotor angle is less than forty-five degrees the dynamic volume that prevents spillage or seal challenge is less than the corresponding static volume. Conversely, if the rotor angle is greater than forty-five degrees the dynamic volume that prevents spillage or seal challenge is greater than the corresponding static volume.

As noted in FORD and Graham, "An Introduction to Centrifugation", page 18, Bios Scientific Publishers, Ltd. (1991), uncapped tubes should be filled only to a level consonant with the degree of such meniscus reorientation. The appropriate level for a tube of given physical parameters and of a given configuration depends the magnitude of the angle $\Theta$ in the centrifuge rotor. The angle of inclination may be different for each fixed angle rotor able to be spun in a given centrifuge instrument, but is typically a value less than forty-five degrees.

The problem of overfilling of tubes may be avoiding by use of a filling gauge such as that shown at page 4–10, Beckman Instruments, "Rotors and Tubes for Preparative Ultracentrifuges—An Operator's Manual", LR—IM—12, March 1985. The filling gauge includes reference to rotor types. Prior to filling, each tube must be aligned with the filling gauge and suitably marked, as with a felt-tipped pen. Such a procedure may be viewed as laborious and time consuming. Moreover, since the marking on the tube may become obliterated when the tube is washed or sterilized the marking procedure using the filling gauge must be repeated each time the tube is re-used.

In view of the foregoing it is believed advantageous to provide a tube for use in a fixed angle centrifuge rotor that includes at least one, but preferably a series, of indicator marking(s) that are permanently provided thereon whereby the tube may be quickly and conveniently filled to a volume level appropriate for use in any one of a plurality of fixed angle rotors without risk of tube spillage or seal challenge due to meniscus re-orientation.

SUMMARY OF THE INVENTION

The present invention relates to a tube for use in a fixed angle centrifuge rotor having a rotor cavity inclined at a predetermined angle $\Theta$ with respect to the axis of rotation. The tube comprises a body having an open mouth and a closed bottom. In accordance with the present invention the body of the tube has at least one, or in the preferred case, a series of markings thereon. Each marking indicates the level to which the tube may be filled with liquid without risk of spillage due to meniscus re-orientation. The markings may be graduated in terms of the angle(s) at which the rotor cavity is inclined or in terms of the identify of each of the rotor(s) into which the tube may be inserted.

If the rotor cavity angle is forty-five degrees or more each marking indicates a level to which the tube may be filled without the occurrence of spillage (if the tube is uncapped) or without challenge to the tube seal (if the tube is capped) when the tube is inserted into a rotor. If the rotor cavity angle is forty-five degrees or less each marking indicates a level to which the tube may be filled without the occurrence of spillage (if the tube is uncapped) or without challenge to the tube seal (if the tube is capped) when the tube is spun in a rotor.

The relationship between the marking(s) on the tube and the physical structure thereof as manifested by its volumetric capacity permits the tube to be efficiently and expeditiously filled for use in a rotor. The permanency of the marking(s) permits the tube to be re-used in the same efficient manner.

BRIEF DESCRIPTION OF THE DRAWINGS

The invention will be more fully understood from the following detailed description, taken in accordance with the accompanying drawings, which form a part of this application and in which.

DETAILED DESCRIPTION OF THE INVENTION

Figure 1:
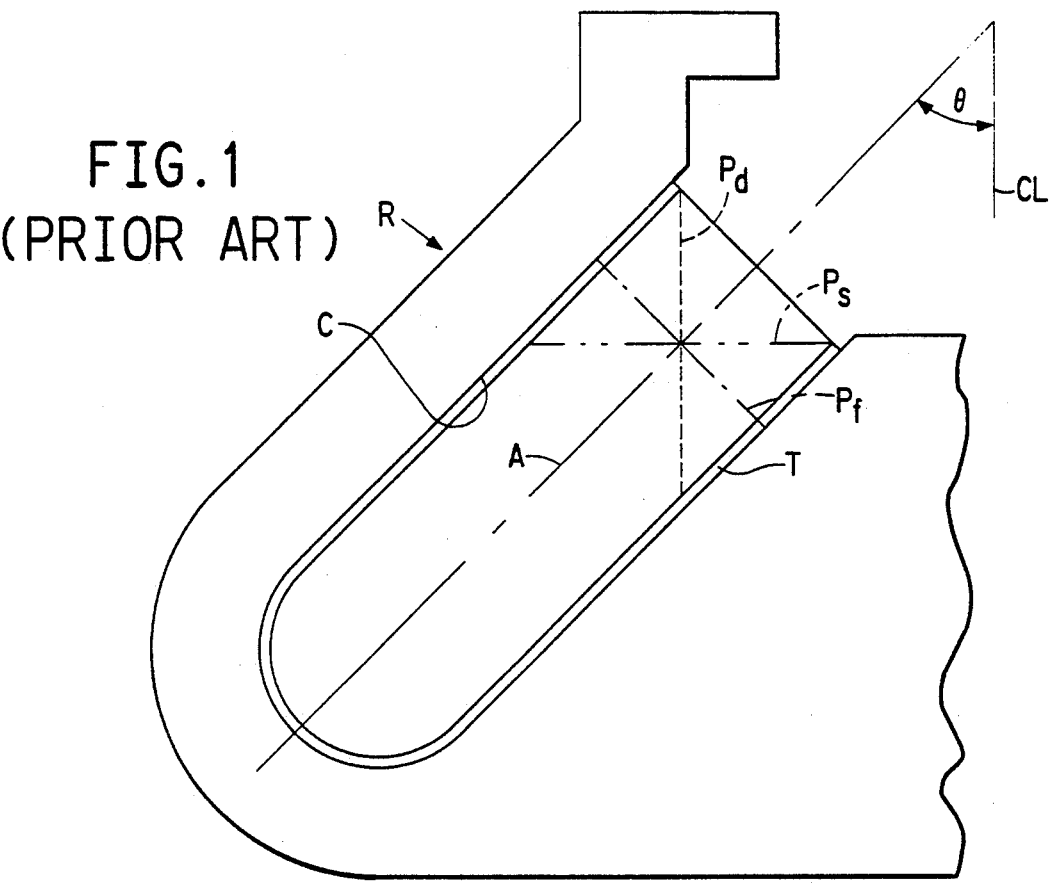
FIG. 1 is a side elevational view of the situation present when an open-mouthed tube having liquid therein is inserted and rotated within a fixed angle centrifuge rotor.

Throughout the following detailed description similar reference numerals refer to similar elements in all Figures of the drawings.

The present invention is directed to a tube 10 for use in at least one, but preferably, in each of a plurality of fixed angle centrifuge rotor(s) able to be used in a given centrifuge instrument. It should be understood that the present invention contemplates the necessity, in some instances, for the use of a suitable adapter to adapt the tube to the cavity of a given rotor. The tube 10 includes a body 12 having an open mouth 14 and a closed bottom 16. Although in the typical case the tube 10 is configured with the body portion 12 being cylindrical and the bottom hemispherical, it should be understood that a tube in accordance with the present invention is not limited to such a configuration.

Figure 2:
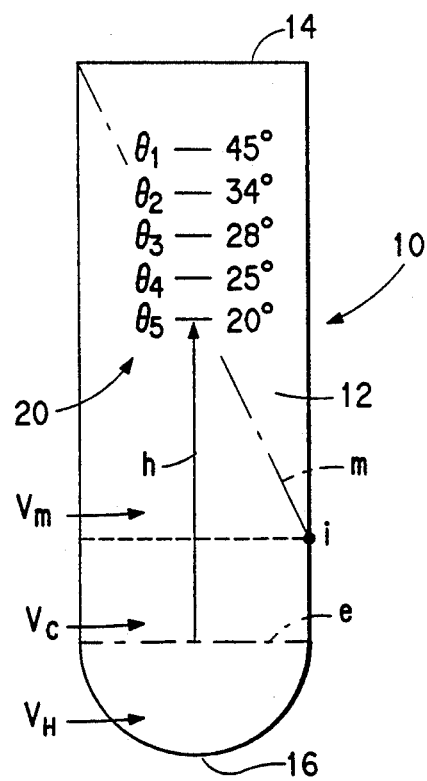
FIGS. 2 and 3 are side elevational views of a tube in accordance with the present invention.
Figure 3:
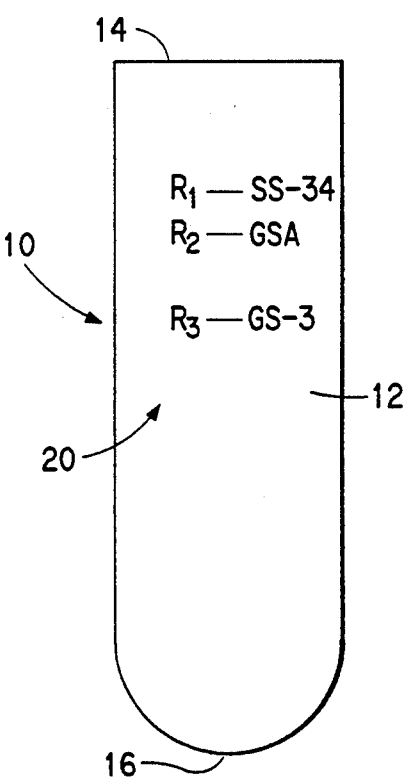

In accordance with the invention the side of the body 12 of the tube 10 has at least one, but more preferably, a series of two or more marking(s) 20 thereon. Each marking 20 is arranged on the tube to indicate the level to which the tube 10 may be filled with liquid (when the axis 10A of the tube 10 is vertically orientated) without risk of spillage due to meniscus re-orientation. As seen in FIG. 2 the marking(s) 20 may be presented in terms of the various angle(s), for example, the angles $\Theta_1$ through $\Theta_5$, at which the axis A of the cavity C may be oriented. Alternatively, as shown in FIG. 3, the marking(s) 20 may be presented in terms of the identity of each of the various rotors, for example, the rotors $R_1$ through $R_3$, into which the tube may be inserted. In FIG. 3 the markings identify various rotors available from the Medical Products Department of E. I. du Pont de Nemours and company, Newtown, Conn.

However they are presented, the interrelationship between the marking(s) 20 and the physical structure of the tube 10 as manifested by its volumetric capacity is such that the tube 10 may be quickly and efficiently filled only to that volumetric level at which the risk of liquid spillage (in a uncapped tube) or seal challenge (in a capped tube) is avoided. The necessity of using a separate filling gauge to fill the tube for each usage, as is required with the prior art, is eliminated.

In accordance with the present invention the marking(s) are permanently provided on the tube 10. To this end, if the tube 10 is formed from a plastic material the marking(s) 20 may be molded with the tube 10, preferably on the outside surface of the body 12. If the tube 10 is fabricated from glass the marking(s) may be etched or otherwise scribed thereon. In either case the markings may be alternatively provided by using a suitable decal or the like that is affixed to the tube 20 or by silk screen printing or silk screen painting on the tube. By "permanent" it is meant that the marking(s) remain present on the tube and remain readable (i.e., are not obliterated as by sterilization and/or washing) over a predetermined useful lifetime of the tube.

As alluded to earlier, depending upon the angle of the rotor cavity, spillage (in the event the tube is uncapped) or seal challenge (in the event the tube is capped) may occur either when the tube is inserted into a rotor or when the rotor is spun. When the rotor cavity angle $\Theta$ is forty-five degrees or more (i.e., $\Theta$ equal to or greater than forty-five degrees) the static volume of the liquid received by the tube before spillage or seal challenge occurs is less than the dynamic volume of liquid at which spillage or seal challenge occurs. Therefore, for such rotors ($\Theta$ equal to forty-five degrees or more), each marking 20 indicates the level at which no spillage or seal challenge occurs when the tube is inserted into a rotor.

Conversely, when the rotor cavity angle $\Theta$ is forty-five degrees or less (i.e., $\Theta$ equal to or less than forty-five degrees) the static volume of the liquid in the tube before spillage or seal challenge occurs is greater than the dynamic volume at which spillage or seal challenge occurs. Thus, for these rotors, each marking 20 indicates the level at which no spillage or seal challenge occurs when the tube is spun in a rotor.

It should be noted that the location of the marking(s) 20 on the tubes 10 shown in FIGS. 2 and 3 is meant as illustrative and are not to be construed as being in strict accordance with any particular scale. The precise location of each marking 20 on a tube 10 would, of course, depend upon the volume of that tube as governed by its physical structural parameters (i.e., size) and its configuration as well as upon the cavity angle(s) of the rotor(s) in which the tube is intended for use.

The location of the marking(s) on a tube may be empirically or analytically derived. As an example, for a tube as shown in FIGS. 2 and 3 (cylindrical body with a hemispherical bottom) inserted into a rotor having a given angle $\Theta_5$, the reorienting liquid level m (FIG. 2) intersects at a point i along the side of the tube above the hemispherical bottom. The height h that the marking (e.g., the marking $\Theta_5$), associated with that given angle $\Theta_5$, should lie on the tube above the lower end e of the cylindrical body portion of the tube may be calculated by considering the volume of the liquid in the full hemispherical bottom portion $V_H$, the volume of any fully cylindrical portion within the body of the tube $V_C$, and the volume of the reorienting meniscus portion within the tube $V_M$. The calculations would be altered if, for example, the intersection point i of the meniscus entered into the bottom of the tube, or the tube was configured to exhibit other than these cylindrical and/or hemispherical shapes.

Those skilled in the art, having the benefit of the teachings of the present invention as hereinabove set forth may effect numerous modifications thereto. Such modifications as are discussed herein and which appear to those skilled in the art are to be construed as lying within the scope of the present invention, as defined by the appended claims.

What is claimed is:

1. A tube for use in a fixed angle centrifuge rotor having a rotor cavity inclined at a predetermined angle $\Theta$ with respect to the axis of rotation, the tube comprising a body having a series of markings permanently provided thereon, each marking including an indication as to the identity of a rotor into which the tube may be inserted, each marking also indicating a level to which the tube may be filled with liquid without risk of spillage or seal challenge due to meniscus re-orientation when the tube is inserted into the rotor identified by the marking.

2. The tube of claim 1 wherein each marking further indicates a level at which no spillage or seal challenge occurs when the tube is spun in a rotor identified by that marking.

3. A tube for use in a fixed angle centrifuge rotor having a rotor cavity inclined at a predetermined angle $\Theta$ with respect to the axis of rotation, the tube comprising a body having a series of markings permanently provided thereon, each marking including an indication as to the angle at which the rotor cavity is inclined, each marking also indicating a level to which the tube may be filled with liquid without risk of spillage or seal challenge due to meniscus re-orientation when the tube is inserted into a rotor having a cavity at the indicated rotor angle.

4. The tube of claim 3 wherein each marking further indicates a level at which no spillage or seal challenge occurs when the tube is spun in a rotor having a cavity at the indicated rotor angle.

* * * * *